United States Patent
Park et al.

(10) Patent No.: US 12,503,174 B2
(45) Date of Patent: Dec. 23, 2025

(54) UPPER MODULE MOUNTING UNIT FOR COMMERCIAL VEHICLE

(71) Applicants: Hyundai Motor Company, Seoul (KR); Kia Corporation, Seoul (KR)

(72) Inventors: Jae-Wook Park, Hwaseong-si (KR); Dong-Hyuk Kwak, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 359 days.

(21) Appl. No.: 18/303,823

(22) Filed: Apr. 20, 2023

(65) Prior Publication Data
US 2024/0174305 A1 May 30, 2024

(30) Foreign Application Priority Data
Nov. 30, 2022 (KR) .................. 10-2022-0163995

(51) Int. Cl.
| | | |
|---|---|---|
| B62D 33/077 | (2006.01) | |
| B62D 24/00 | (2006.01) | |
| B62D 27/06 | (2006.01) | |
| F16F 15/10 | (2006.01) | |

(52) U.S. Cl.
CPC ........... *B62D 33/077* (2013.01); *B62D 24/00* (2013.01); *B62D 27/06* (2013.01); *F16F 15/10* (2013.01)

(58) Field of Classification Search
CPC ....... B62D 24/00; B62D 33/077; B62D 27/06
USPC .............................. 296/35.1, 35.3
See application file for complete search history.

(56) References Cited

U.S. PATENT DOCUMENTS

| | | | | |
|---|---|---|---|---|
| 3,521,845 A | * | 7/1970 | Sweda ................. | B60P 7/132 410/83 |
| 3,643,906 A | * | 2/1972 | Werner ................. | B60P 7/132 410/83 |
| 3,717,372 A | * | 2/1973 | Carr ................. | B60P 7/132 410/82 |
| 3,768,857 A | * | 10/1973 | Horton ................. | B60P 7/132 410/83 |
| 3,825,294 A | * | 7/1974 | Carr ................. | B60P 7/132 410/82 |
| 4,026,596 A | * | 5/1977 | Carr ................. | B60P 7/132 410/82 |
| 4,321,000 A | * | 3/1982 | Novak ................. | B60P 7/132 410/82 |
| 4,437,211 A | * | 3/1984 | Dorpmund ......... | B65D 90/0013 410/82 |
| 9,937,997 B2 | * | 4/2018 | Himmelmann ........... | B64C 1/20 |
| 10,486,583 B2 | * | 11/2019 | Jo ........................ | B65D 90/00 |

FOREIGN PATENT DOCUMENTS

KR 20140013636 A 2/2014

* cited by examiner

*Primary Examiner* — Dennis H Pedder
(74) *Attorney, Agent, or Firm* — SLATER MATSIL, LLP (57) ABSTRACT

The present disclosure relates to an upper module mounting unit for a vehicle that allows an upper module to be mounted on a frame by lever operation. The upper module mounting unit according to the present disclosure includes a base mounted on a frame of a vehicle, and a main rod rotatably installed on the base, the main rod having a head configured to pass through a mounting bracket mounted on an upper module of the vehicle, the main rod configured to be fixed to the mounting bracket by being caught thereon according to rotation of the main rod.

18 Claims, 12 Drawing Sheets

<unlock>

FIG. 7

<lock>

UPPER MODULE MOUNTING UNIT FOR COMMERCIAL VEHICLE

CROSS-REFERENCE TO RELATED APPLICATIONS

This application claims priority to Korean Patent Application No. 10-2022-0163995, filed on Nov. 30, 2022, which is incorporated herein by reference in its entirety.

TECHNICAL FIELD

The present disclosure relates to an upper module mounting unit for a commercial vehicle used to mount an upper module to a frame of a commercial vehicle.

BACKGROUND

Figure 1:
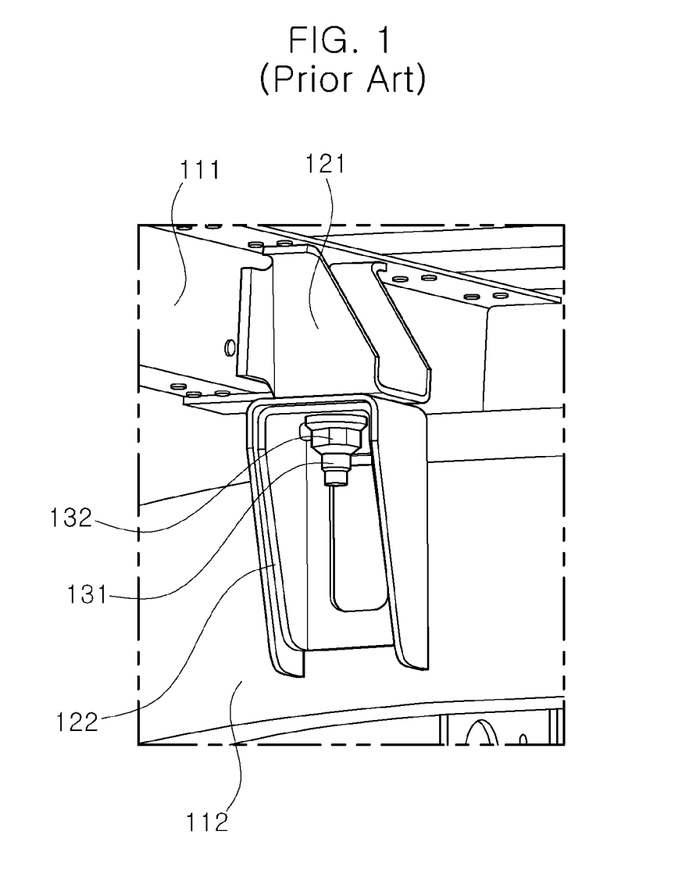
FIG. 1 is a perspective view illustrating a state in which an upper module is mounted on a frame according to the related art.

Commercial vehicles such as trucks (hereinafter referred to as 'vehicle') can be used for various purposes by replacing and mounting an upper module 111 in a frame 112 of a vehicle instead of the loading box.

The upper module 111 may be an oil tank, a camping module, and a box-type loading box or the like. For example, the oil tank may be mounted on the frame 112 to be used as a mobile refueling vehicle, or the camping module may be mounted to be used as a camping car. Alternatively, when the upper module 111 is applied with the box-type loading box, after the cargo is pre-loaded inside the loading box, the empty loading box on the frame 112 is separated from the frame 112 for the vehicle, and the loading box loaded the cargo inside is mounted on the frame 112 for the vehicle. Thereby reducing time required to load the cargo in cargo logistics such as courier.

Mounting brackets 121 and 122 are fastened to the upper module 111 and the frame 112, respectively, by fastening the mounting brackets 121 and 122 at multiple points using a fastening bolt 131 and a fastening nut 132, thereby the upper module 111 is mounted on the frame 112.

However, when the upper module 111 is mounted using the fastening bolt 131 and the fastening nut 132, since the fastening bolt 131 and the fastening nut 132 need to be fastened, it is not easy to attach and detach the upper module 111. In the case of removing the loading box and mounting the other upper module 111, the fastening bolt 131 and the fastening nut 132 are released from each mounting portion to remove the previously mounted loading box, after adjusting a position of a new upper module 111, the fastening bolt 131 and the fastening nut 132 are fastened again, so that the upper module 111 is mounted.

However, since the fastening bolt 131 and the fastening nut 132 are repeated at multiple points to be released and recombined, it took a lot of time and it was not easy to align the position when mounting the new upper module 111.

SUMMARY

The present disclosure relates to an upper module mounting unit for a commercial vehicle used to mount an upper module to a frame of a commercial vehicle, and more specifically, the upper module mounting unit for a commercial vehicle that can be easily mounted to the frame by lever manipulation so as not to perform bolting.

The present disclosure has been invented to solve the above problems, and an object of the present disclosure is to provide an upper module mounting unit for a commercial vehicle capable of mounting an upper module by a simple lever operation without fastening a fastening bolt and a fastening nut by a tool.

To achieve the above object, the upper module mounting unit for a commercial vehicle according to the present disclosure includes a base mounted on a frame of a vehicle, and a main rod rotatably installed on the base, having a head passing through a mounting bracket mounted on an upper module of the vehicle, and being fixed to the mounting bracket by being caught thereon according to rotation of the main rod.

As an exemplary embodiment, the head may be formed at a top of the main rod, passes through a fixing hole formed in the mounting bracket, and is caught or released by the rotation of the main rod.

As an exemplary embodiment, the fixing hole may be formed as a longitudinal hole, and the head may be formed in a shape corresponding to the fixing hole and is formed so that the cross-sectional area increases from top to bottom.

As an exemplary embodiment, a mounting hole and a through hole may be formed in upper and lower surfaces of the base, respectively, and the main rod may be installed to pass through the fixing hole and the through hole.

As an exemplary embodiment, the upper module mounting unit for a commercial vehicle further includes a lever protruding from the main rod, lifting and rotating the main rod.

As an exemplary embodiment, the lever may be formed to protrude from a side of the main rod to a predetermined length in a direction perpendicular to an axial direction of the main rod, and then extend downward.

As an exemplary embodiment, a cover fastened to the base and accommodating the main rod therein may be further included, and the lever may pass through the cover.

As an exemplary embodiment, a guide groove through which the lever passes to guide an elevation and rotation of the lever may be formed in the cover, and the lever may be installed to pass through the guide groove.

As an exemplary embodiment, a damper installed by being inserted into the main rod, opened outward when the main rod rotates, and fixed by being inserted into between the main rod and the fixing hole may be further included.

As an exemplary embodiment, an expansion portion opened outward with a predetermined interval may be formed on the damper, a cam unit protruding outward along the circumferential direction of the main rod may be formed on the main rod, and when the main rod rotates, the cam unit may press the expansion portion outward, and the expansion portion may be fixed between the main rod and the fixing hole.

As an exemplary embodiment, the expansion portion and the cam unit may be formed at intervals of 180 degrees on the damper and the main rod, respectively, and when the head and the fixing hole are aligned in different directions, the cam unit may press the expansion portion so that the expansion portion is opened outward.

As an exemplary embodiment, a spring for elastically supporting the cam unit to the head may be provided on the main rod.

As an exemplary embodiment, a locking protrusion may be formed on the main rod, and a washer supporting a bottom of the spring may be inserted into the locking protrusion.

As an exemplary embodiment, a cap nut may be fastened to the lower portion of the main rod.

According to the upper module mounting unit for a commercial vehicle of the present disclosure having the configuration, an upper module may be easily mounted on a frame of the vehicle with only a simple lever operation without fastening bolts and nuts using a separate tool.

DETAILED DESCRIPTION OF ILLUSTRATIVE EMBODIMENTS

Hereinafter, an upper module mounting unit for a commercial vehicle according to the present disclosure will be described in detail with reference to the accompanying drawings.

Figure 2:
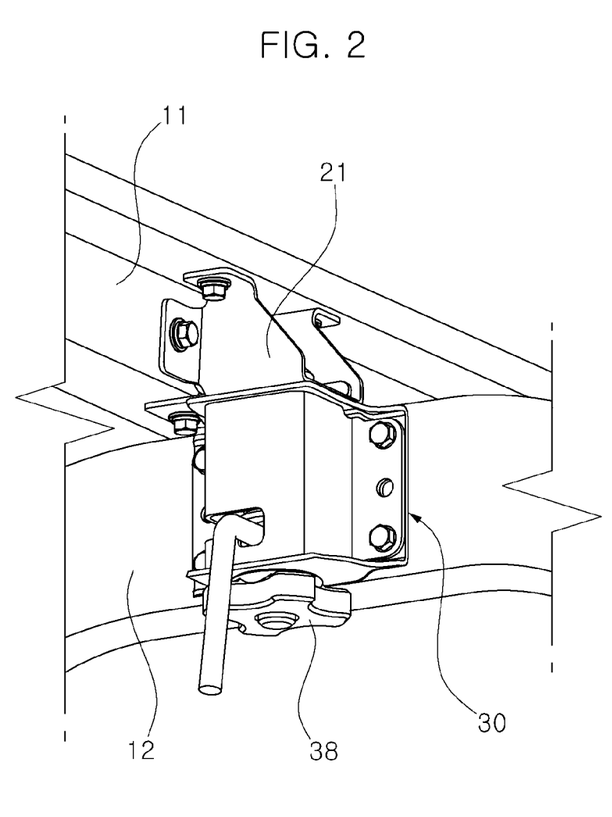
FIG. 2 is a perspective view illustrating a state in which an upper module is mounted on a frame using an upper module mounting unit for a commercial vehicle according to the present disclosure.
Figure 3:
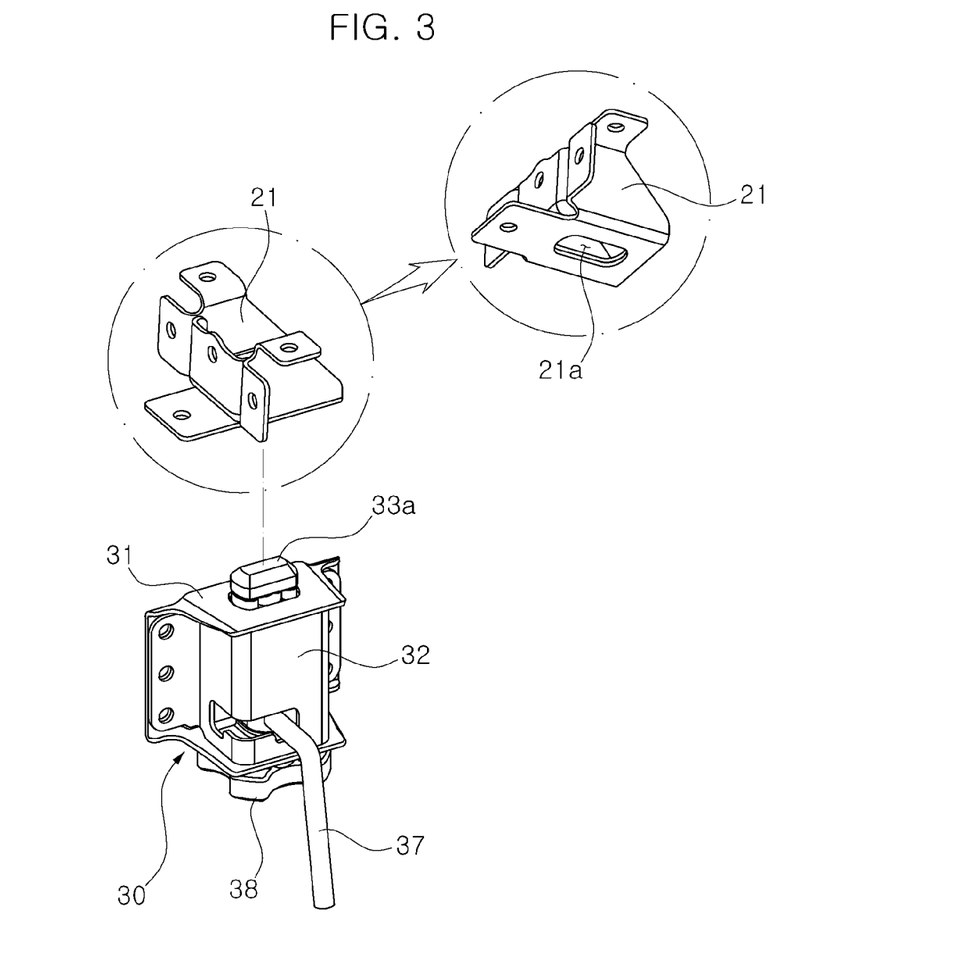
FIG. 3 is an exploded perspective view illustrating a coupling relationship between the upper module mounting unit for a commercial vehicle and a mounting bracket according to the present disclosure.
Figure 4:
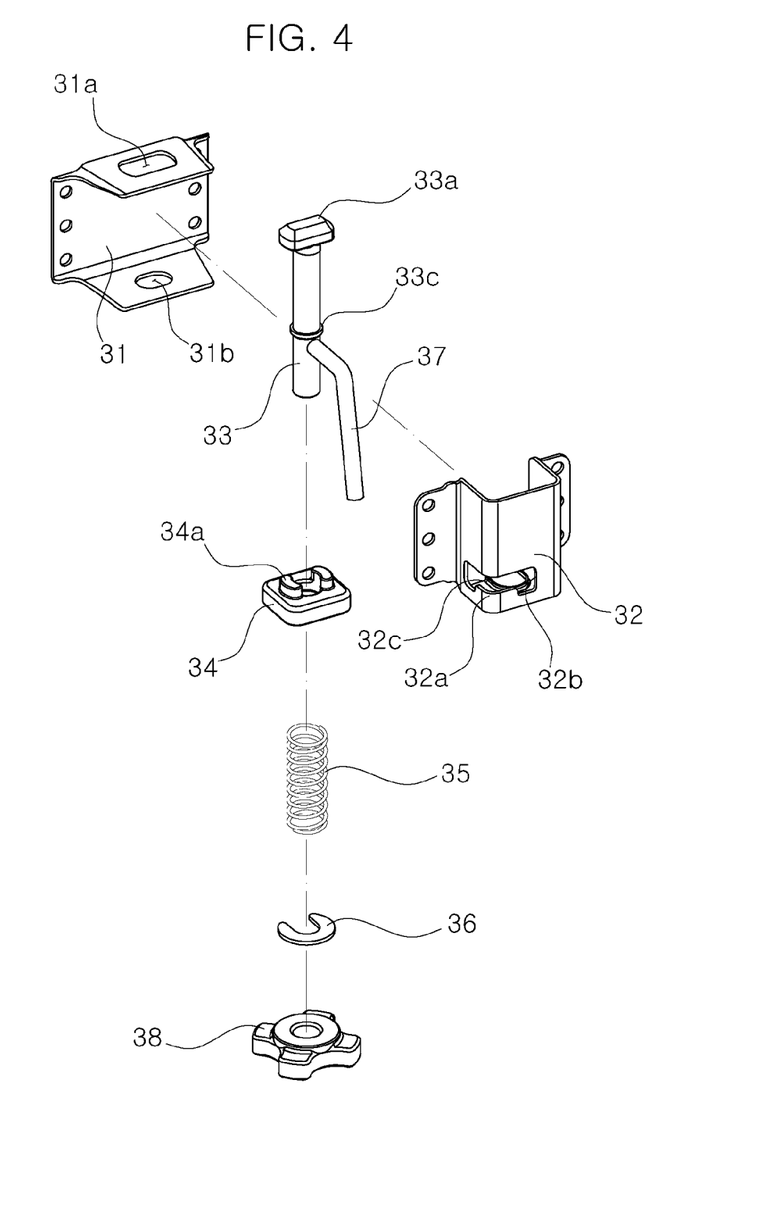
FIG. 4 is an exploded perspective view illustrating the upper module mounting unit for a commercial vehicle according to the present disclosure.

FIG. 2 is a perspective view illustrating a state in which an upper module is mounted on a frame using an upper module mounting unit for a commercial vehicle according to the present disclosure. FIG. 3 is an exploded perspective view illustrating a coupling relationship between the upper module mounting unit for a commercial vehicle and a mounting bracket according to the present disclosure. FIG. 4 is an exploded perspective view illustrating the upper module mounting unit for a commercial vehicle according to the present disclosure.

The upper module mounting unit for a commercial vehicle according to the present disclosure includes a base 31 mounted on a frame 12 of a vehicle, and a main rod 33 rotatably installed on the base 31, having a head 33a passing through a mounting bracket 21 mounted on an upper module 11 of the vehicle, and being fixed to the mounting bracket 21 by being caught thereon according to rotation of the main rod.

The base 31 is mounted to the frame 12. An upper surface and a lower surface of the base 31 are formed to be bent in a horizontal direction, respectively. A mounting hole 31a and a through hole 31b are formed in an upper surface and a lower surface of the base 31, respectively. The mounting hole 31a is formed as a longitudinal hole.

A cover 32 is fastened to the outside of the base 31. The cover 32 has a space formed in the middle thereof, and has a shape to be bent so that the main rod 33 to be described below may be positioned. A guide groove 32b for guiding the movement of a lever 37 is formed in the cover 32. The guide groove 32b guides the lever 37 to move along a predetermined trajectory. The guide groove 32b is formed along a circumferential direction of the main rod 33. In addition, the guide groove 32b has a partition wall 32a formed in the middle thereof, so that both ends thereof are deeper than the middle thereof. In this way, the lever 37 may be lifted at both ends of the guide groove 32b and rotated around the main rod 33 at the middle portion of the guide groove 32b.

A support unit 32c for supporting the main rod 33 is formed at the lower portion of the cover 32 while the main rod 33 passes therethrough.

The main rod 33 is rotatably installed on the base 31, and an upper end of the main rod 33 is fixed or released by being caught by the mounting bracket 21 mounted on an upper module 11 depending on the rotational state. As the upper end of the main rod 33 is fixed by being caught by the mounting bracket 21, the upper module 11 is kept mounted on the frame 12. When the upper end of the main rod 33 is released from the mounting bracket 21, the upper module 11 may be separated from the frame 12 or a new upper module 11 may be installed.

Figure 5:
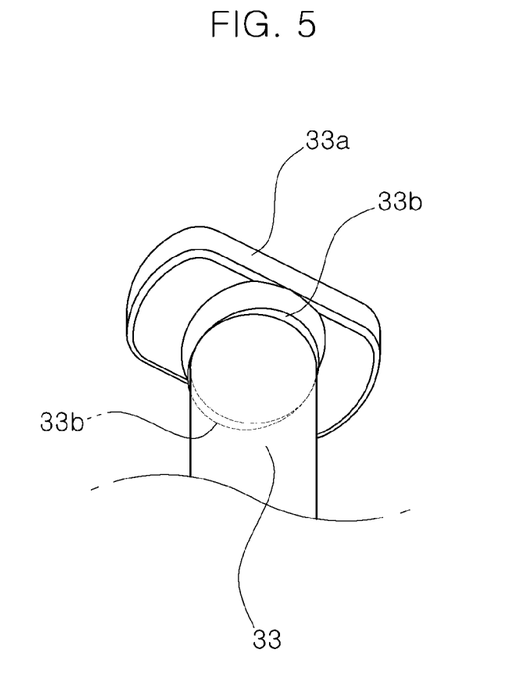
FIG. 5 is a bottom perspective view illustrating a head of a main rod in the upper module mounting unit for a commercial vehicle according to the present disclosure.

FIG. 5 is a bottom perspective view illustrating a head of a main rod in the upper module mounting unit for a commercial vehicle according to the present disclosure.

A head 33a is formed on the upper end of the main rod 33. The head 33a passes through or is caught by a fixing hole 21a formed in the mounting bracket 21 according to a rotation of the main rod 33. The fixing hole 21a is formed as a longitudinal hole, and the head 33a is formed in a shape corresponding thereto. Since the fixing hole 21a and the head 33a are formed in the same shape, and the head 33a is formed to have a slightly smaller size, when the fixing hole 21a and the head 33a are aligned in the same direction, the head 33a may pass through the fixing hole 21a. In a state where the head 33a passes through the fixing hole 21a, when the fixing hole 21a and the head 33a are aligned in different directions, the head 33a is fixed by being caught by the fixing hole 21a.

Meanwhile, a cross-sectional area of the head 33a is formed to increase from the upper end to the lower end of the head 33a. Accordingly, the head 33a may be easily inserted into the fixing hole 21a.

In addition, the mounting hole 31a formed in the base 31 is also formed as a longitudinal hole through which the head 33a may pass. The mounting hole 31a has a longitudinal axis formed in a direction perpendicular to the fixing hole 21a.

A lever 37 is formed to protrude from the main rod 33. The lever 37 is used by an operator to lift and rotate the main rod 33. The lever 37 is formed to protrude to a predetermined length in a direction perpendicular to an axial direction of the main rod 33 on the side surface of the main rod 33, and then extend downward.

The lever 37 is installed to pass through a guide groove 32b, and is lifted and rotated while being guided by the guide groove 32b. The guide groove 32b guides the lever 37 to be raised and lowered at both ends thereof, and guides the lever 37 to be rotated at an intermediate portion thereof.

A damper 34 is installed by being inserted into the main rod 33. The damper 34 is opened outward when the main rod 33 rotates and is fixed between the main rod 33 and the fixing hole 21a.

The main rod 33 has a cam unit 33b formed to pressurize an expansion portion 34a outward when the main rod 33 rotates. The cam unit 33b may be formed to protrude to the outside of the main rod 33, and may be opened to the outside by pressing the expansion portion 34a to the outside according to the rotation of the main rod 33. The cam unit 33b is formed at an interval at which the expansion portion 34a is formed, that is, at an interval of 180 degrees. When the cam unit 33b is positioned parallel to the expansion portion 34a, the expansion portion 34a is pressed outward in the fixing hole 21a to fill a gap c between the expansion portion 34a and the fixing hole 21a, and thus when the upper module 11 is mounted, the gap is not generated.

The expansion portion 34a is formed at a 180 degree interval on the damper 34, and accordingly, the cam unit 33b is also formed at the 180 degree interval on the main rod 33.

When the head 33a and the fixing hole 21a are aligned in different directions, the cam unit 33b presses the expansion portion 34a so that the expansion portion 34a is opened outward.

A spring 35 is inserted into the main rod 33 to elastically support the damper 34 to the head 33a. The spring 35 is formed in the shape of a coil spring 35 and is inserted into the main rod 33.

A washer 36 supports a bottom surface of the spring 35. The washer 36 supports the bottom surface of the spring 35 by being inserted into the main rod 33. A locking protrusion 33c supporting a bottom surface of the washer 36 is formed to protrude from the main rod 33.

A cap nut 38 is fastened to the lower portion of the main rod 33. The cap nut 38 is fastened to the main rod 33 outside a bottom surface of the base 31, so that the main rod 33 is not separated from the base 31.

The operation state of the upper module mounting unit for a commercial vehicle according to the present disclosure with the configuration will be described as follows.

Figure 6:
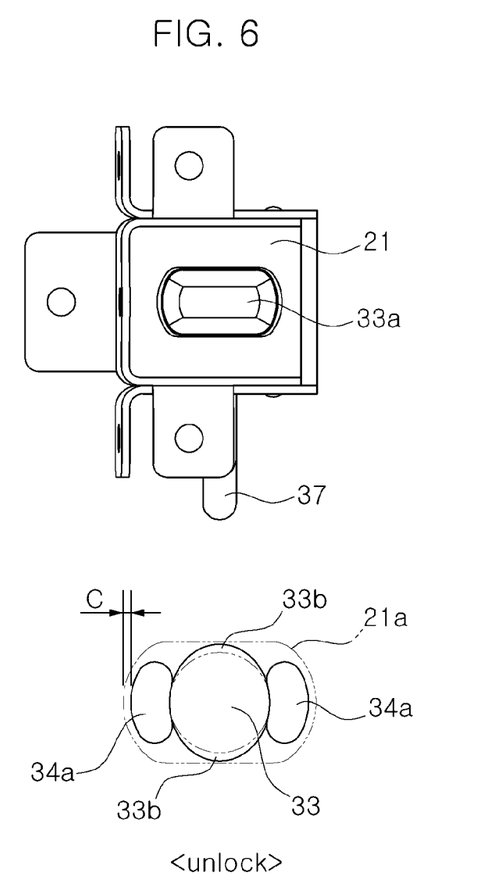
FIG. 6 is a plane view illustrating an unlocked state of the upper module mounting unit for a commercial vehicle according to the present disclosure in a state in which the upper module is mounted on the frame.
Figure 7:
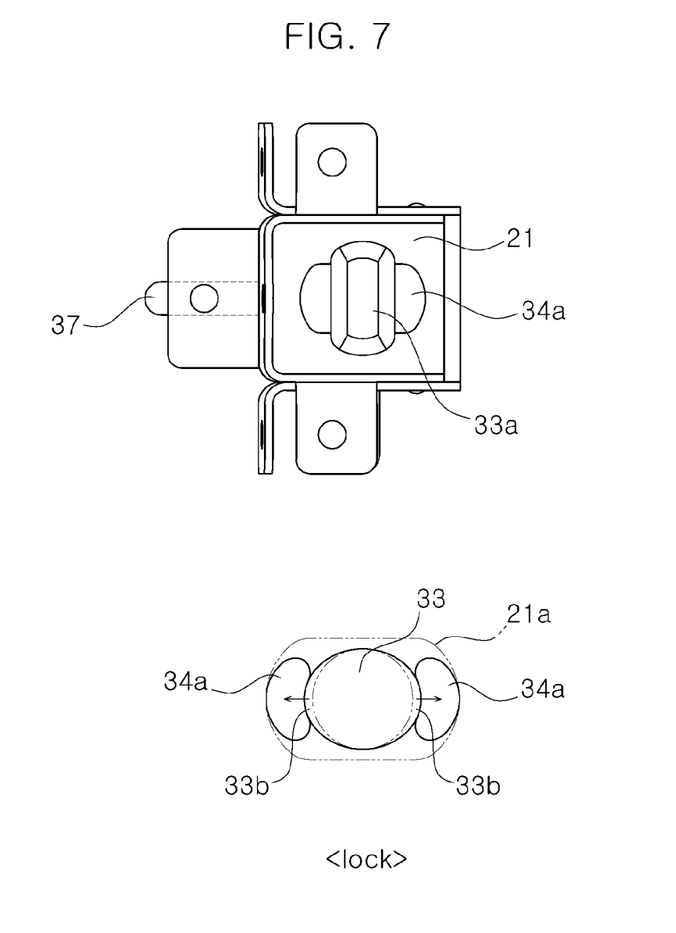
FIG. 7 is a plane view illustrating a locked state of the upper module mounting unit for a commercial vehicle according to the present disclosure in a state in which the upper module is mounted on the frame.

FIG. 6 is a plane view illustrating an unlocked state of the upper module mounting unit for a commercial vehicle according to the present disclosure in a state in which the upper module is mounted on the frame. FIG. 7 is a plane view illustrating a locked state of the upper module mounting unit for a commercial vehicle according to the present disclosure in a state in which the upper module is mounted on the frame. FIGS. 8A to 8E are perspective views illustrating a process of operating the upper module mounting unit 30 to mount mounting the upper module 11 on the frame 12.

Figure 8A:
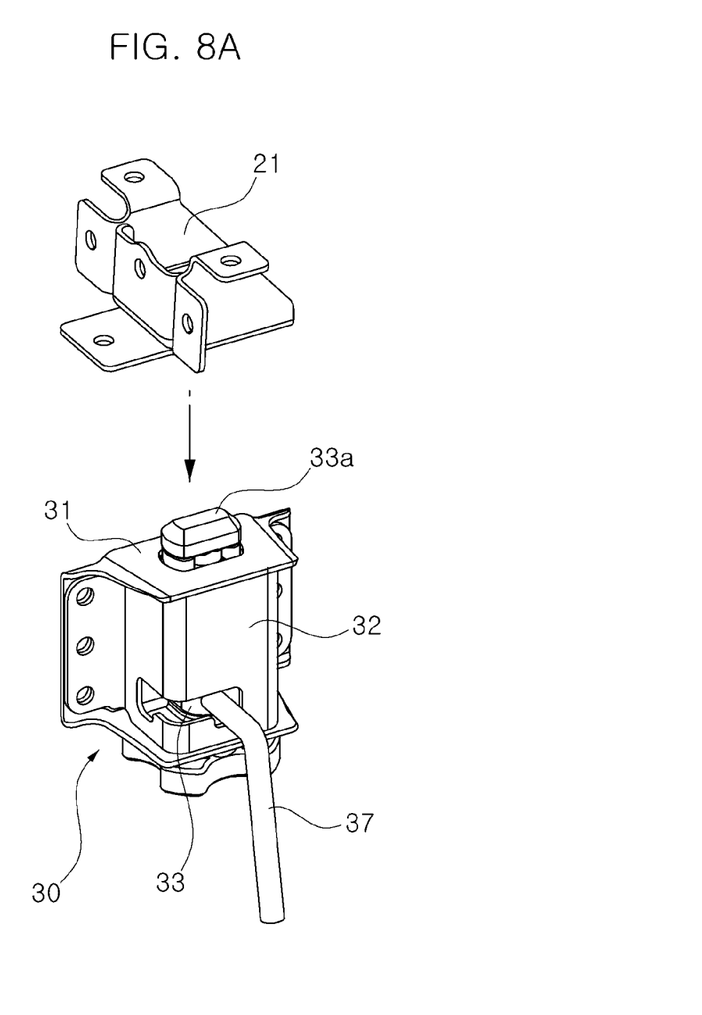
FIGS. 8A to 8E are perspective views illustrating a process of operating the upper module mounting unit for a commercial vehicle from the unlocked state to the locked state step by step according to the present disclosure.

In order for the upper module 11 to be mounted by the frame 12, the upper module 11 is positioned so that the mounting bracket 21 is located on an upward of the upper module mounting unit 30 (refer to FIG. 8A).

Figure 8B:
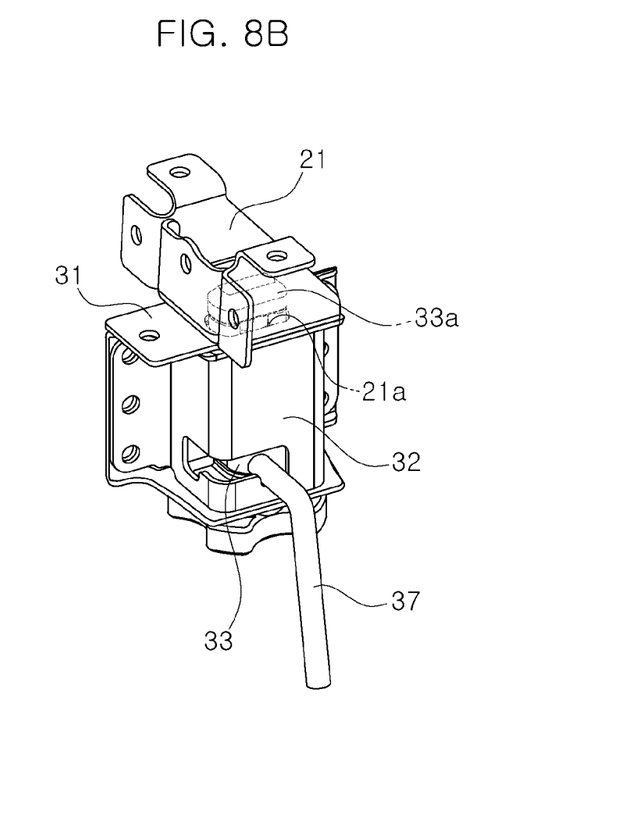

Thereafter, the upper module 11 is lowered and seated on a bottom surface of the mounting bracket 21 and an upper surface of the base 31 (refer to FIG. 8B). When the upper module 11 is lowered, the head 33a is inserted into the fixing hole 21a of the mounting bracket 21. In an unlocked state, the fixing hole 21a and the head 33a are aligned in the same direction, so the head 33a may pass through the fixing hole 21a. When the upper module 11 is continuously lowered, the bottom surface of the mounting bracket 21 is seated on the upper surface of the base 31. In this state, the head 33a passes through the fixing hole 21a, and the damper 34 is positioned in the fixing hole 21a.

Since the upper module mounting unit 30 is in the unlocked state and the head 33a is aligned in the same direction as the fixing hole 21a, the upper module 11 is not fixed (refer to FIG. 6). In addition, since the cam unit 33b does not pressurize the expansion portion 34a, there is a gap c between the expansion portion 34a and the fixing hole 21a, thereby there is a gap between the upper module 11 and the frame.

Figure 8C:
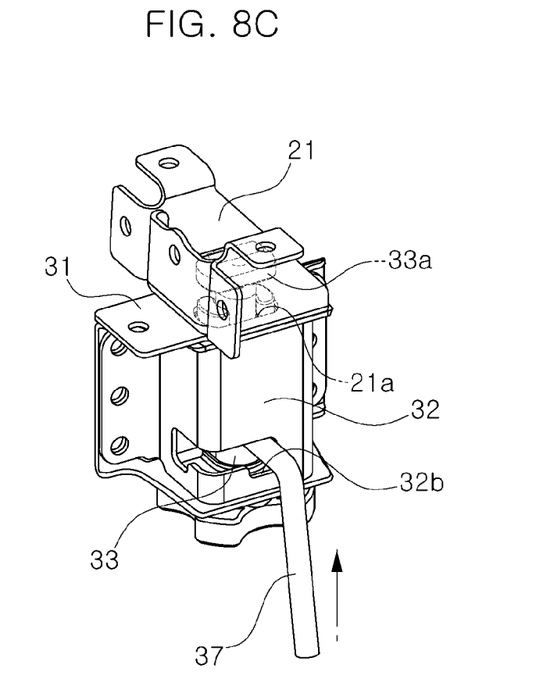

As illustrated in FIG. 8C, the lever 37 is raised. When the lever 37 rises in the guide groove 32b, the lever 37 becomes rotatable state. If the cap nut 38 is tightened before the lever 37 is raised, the cap nut 38 is released.

When the lever 37 is rotated (refer to FIG. 8D), the main rod 33 is also rotated at the same time, causing the upper module mounting unit 30 to be in the locked state.

Figure 8D:
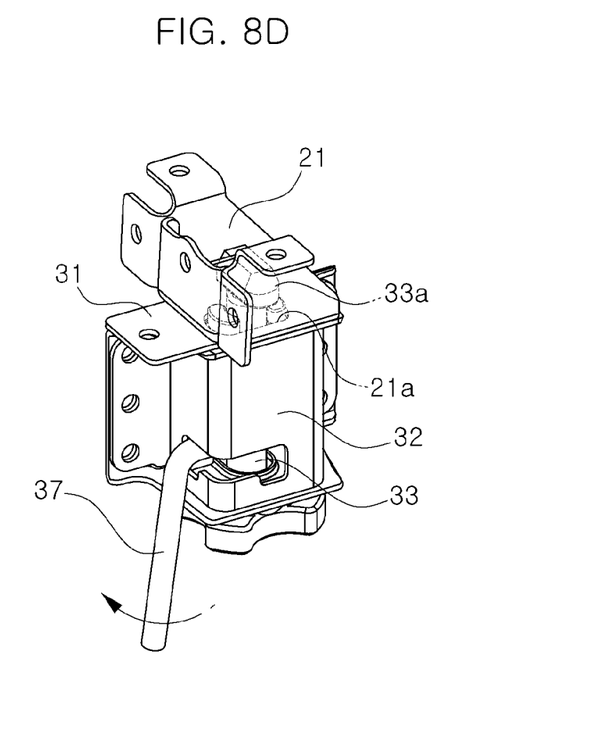

When the main rod 33 is rotated, the head 33a is aligned in a direction perpendicular to the fixing hole 21a from a state in which the head 33a and the fixing hole 21a are aligned in the same direction. When the head 33a and the fixing hole 21a are vertically aligned with each other, the head 33a is caught by the fixing hole 21a, so that the mounting bracket 21 is not separated from the upper module mounting unit 30.

In addition, when the main rod 33 is rotated, the cam unit 33b presses the damper 34 outward, and the damper 34 is inserted between the main rod 33 and the fixing hole 21a to fill a gap therebetween (refer to FIG. 7). Accordingly, when the upper module 11 is mounted on the frame 12, the gap is prevented.

Figure 8E:
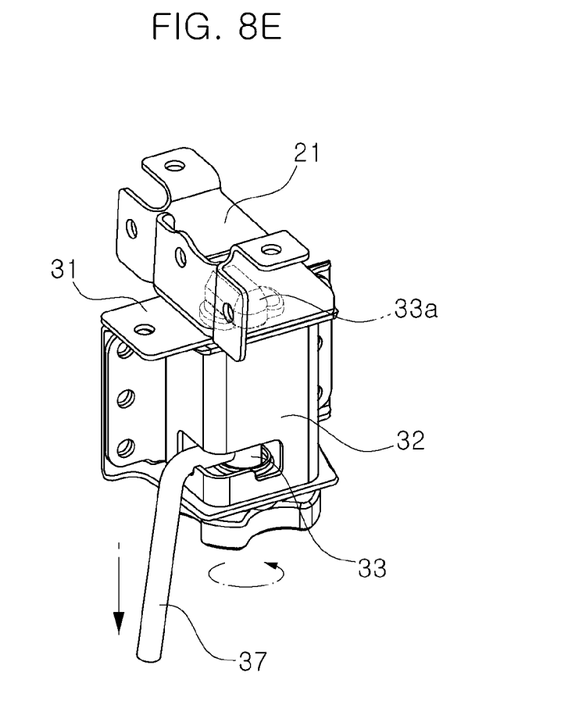

Finally, as illustrated in FIG. 8E, the lever 37 is lowered so that the lever 37 is not separated by being caught on one side of the guide groove 32b, and the cap nut 38 is tightened to maintain a locked state.

Meanwhile, a process of separating the upper module 11 is performed in reverse to the mounting process so that the upper module mounting unit 30 is made to be in the unlocked state from the locked state. The head 33a and the fixing hole 21a of the mounting bracket 21 are aligned in the same direction when the upper module mounting unit 30 is in the unlocked state. When the head 33a and the fixing hole 21a of the mounting bracket 21 are aligned in the same direction, since the mounting bracket 21 and the upper module mounting unit 30 are in a detachable state, the upper module 11 is lifted and separated.

What is claimed is:

1. An upper module mounting unit for a commercial vehicle, comprising:
   a base mounted on a frame of a vehicle;
   a main rod rotatably installed on the base, wherein:
      the main rod comprises a head configured to pass through a mounting bracket mounted on an upper module of the vehicle, and
      the main rod is configured to be fixed to the mounting bracket by being caught thereon according to rotation of the main rod;
   a fixing hole formed in the mounting bracket; and
   a damper configured to be inserted into the main rod and opened outward when the main rod rotates, wherein the damper is configured to be inserted between the main rod and the fixing hole.

2. The upper module mounting unit of claim 1, wherein:
   the head is at a top of the main rod,
   the head is configured to pass through the fixing hole, and
   the head is caught or released by the rotation of the main rod.

3. The upper module mounting unit of claim 2, wherein:
   the fixing hole has a longitudinal hole, and
   the head has a shape corresponding to the fixing hole and has a cross-sectional area that increases from top to bottom.

4. The upper module mounting unit of claim 2, wherein:
a mounting hole and a through hole are in upper and lower surfaces of the base, respectively, and
the main rod is configured to pass through the fixing hole and the through hole.

5. The upper module mounting unit of claim 1, further comprising:
a lever protruding from the main rod,
wherein the lever is configured to lift and rotate the main rod.

6. The upper module mounting unit of claim 5, wherein:
the lever protrudes from a side of the main rod to a predetermined length in a direction perpendicular to an axial direction of the main rod, and
the lever bends downward from the protrusion.

7. The upper module mounting unit of claim 6, further comprising:
a cover fastened to the base and accommodating the main rod therein,
wherein the lever is configured to pass through the cover.

8. The upper module mounting unit of claim 7, further comprising:
a guide groove in the cover,
wherein:
the guide groove is configured to guide an elevation and rotation of the lever, and
the lever is configured to pass through the guide groove.

9. The upper module mounting unit of claim 1, further comprising:
a cam unit protruding outward along a circumferential direction of the main rod,
wherein:
the damper comprises an expansion portion opened outward at a predetermined interval, and
the cam unit, the damper, the expansion portion, and the main rod are configured such that when the main rod rotates, the cam unit presses the expansion portion outward, and the expansion portion is fixed between the main rod and the fixing hole.

10. The upper module mounting unit of claim 9, wherein:
the expansion portion and the cam unit are at intervals of 180 degrees on the damper and the main rod, respectively, and
the expansion portion and the cam unit are configured such that when the head and the fixing hole are aligned in different directions, the cam unit presses the expansion portion so that the expansion portion is opened outward.

11. The upper module mounting unit of claim 9, further comprising:
a spring on the main rod,
wherein the spring is configured to elastically support the cam unit to the head.

12. The upper module mounting unit of claim 11, further comprising:
a locking protrusion on the main rod; and
a washer supporting a bottom of the spring and configured to be inserted into the locking protrusion.

13. The upper module mounting unit of claim 1, further comprising:
a cap nut configured to be fastened to a lower portion of the main rod.

14. An upper module mounting unit for a vehicle, comprising:
a base configured to be mounted on a frame of the vehicle;
a main rod configured to be rotatably installed on the base, wherein:
the main rod comprises a head at a top of the main rod,
the head is configured to pass through a mounting bracket mounted on an upper module of the vehicle,
the head is configured to be caught or released by rotation of the main rod, and
the head is configured to pass through a fixing hole formed in the mounting bracket; and
a damper configured to be inserted into the main rod and opened outward when the main rod rotates, the damper configured to be inserted between the main rod and the fixing hole.

15. The upper module mounting unit of claim 14, wherein:
the fixing hole comprises a longitudinal hole, and
the head has a shape corresponding to the fixing hole and has a cross-sectional area that increases from top to bottom.

16. The upper module mounting unit of claim 15, wherein:
a mounting hole and a through hole are in upper and lower surfaces of the base, respectively, and
the main rod is configured to pass through the fixing hole and the through hole.

17. The upper module mounting unit of claim 14, further comprising:
a lever protruding from the main rod; and
a cover fastened to the base and accommodating the main rod therein,
wherein the lever is configured to pass through the cover.

18. The upper module mounting unit of claim 17, further comprising:
a guide groove in the cover,
wherein:
the guide groove is configured to guide an elevation and rotation of the lever, and
the lever is configured to pass through the guide groove.

* * * * *